United States Patent
Li et al.

(10) Patent No.: US 10,865,041 B2
(45) Date of Patent: Dec. 15, 2020

(54) BAGGING MECHANISM FOR TRASH BAGS AND SMART TRASH RECEPTACLE

(71) Applicant: SHANGHAI TOWNEW INTELLIGENT TECHNOLOGY CO., LTD., Shanghai (CN)

(72) Inventors: Jianxiang Li, Shanghai (CN); Le Li, Shanghai (CN)

(73) Assignee: SHANGHAI TOWNEW INTELLIGENT TECHNOLOGY CO., LTD., Shanghai (CN)

(*) Notice: Subject to any disclaimer, the term of this patent is extended or adjusted under 35 U.S.C. 154(b) by 148 days.

(21) Appl. No.: 16/210,898

(22) Filed: Dec. 5, 2018

(65) Prior Publication Data
US 2019/0382197 A1 Dec. 19, 2019

(30) Foreign Application Priority Data
Jun. 16, 2018 (CN) .......................... 2018 1 0623551

(51) Int. Cl.
*B65F 1/06* (2006.01)
*B65F 1/14* (2006.01)
(Continued)

(52) U.S. Cl.
CPC .............. *B65F 1/1415* (2013.01); *B65F 1/06* (2013.01); *B65F 1/14* (2013.01); *B29C 65/18* (2013.01);
(Continued)

(58) Field of Classification Search
CPC .......... B65F 2210/162; B65F 2210/167; B65F 2210/168; B65F 2210/20; B65F 2230/14;
(Continued)

(56) References Cited

U.S. PATENT DOCUMENTS 2,513,459 A * 7/1950 Dodge .................... B65B 25/04
53/138.4
2,527,449 A * 10/1950 Sam Poole ......... B65B 67/1211
220/264
(Continued)

FOREIGN PATENT DOCUMENTS

CN 109573386 A * 4/2019
EP 0046591 A2 * 3/1982 ............. B65B 51/00
(Continued)

*Primary Examiner* — Stephen F. Gerrity
*Assistant Examiner* — Joshua G Kotis
(74) *Attorney, Agent, or Firm* — Rabin & Berdo, P.C.

(57) ABSTRACT

The present invention discloses a bagging mechanism for trash bags and a smart trash receptacle. The bagging mechanism is disposed within a body of the trash receptacle. A first fixed edge and a second fixed edge intersecting the first fixed edge are provided at tops of internal surfaces of the body of the trash receptacle. The bagging mechanism includes a first pressing bar, which is able to slide along the second fixed edge to gather the open end of the trash bag onto the first fixed edge, and a second pressing bar, which is able to slide along the first fixed edge to gather the open end of the trash bag onto the second fixed edge. The first pressing bar and the second pressing bar are further able to work together to gather the trash bag to the intersection of the first fixed edge and the second fixed edge. In the vicinity of the intersection, a heat fusing device is disposed for heat fusing and sealing the trash bag. The bagging mechanism further includes driving means for driving the first pressing bar and the second pressing bar to move. With this arrangement, the issue that conventional smart trash receptacles do not have an automatic bagging mechanism or are only capable of semi-automatic trash bagging, with insufficient bag sealing, insecure sealing and low loading capacity can be solved.

16 Claims, 4 Drawing Sheets

(51) Int. Cl.
  *B29C 65/18* (2006.01)
  *B29C 65/78* (2006.01)

(52) U.S. Cl.
  CPC ..... *B29C 65/7841* (2013.01); *B65F 2210/162* (2013.01); *B65F 2210/167* (2013.01)

(58) Field of Classification Search
  CPC .. B65F 1/06; B65F 1/1415; B65B 2067/1283; B65B 51/146; B65B 51/04; B65B 7/02; B65B 45/00; B65B 51/00; B65B 67/1238; B65B 67/1244; B65B 67/125; B65B 67/1211; B29C 65/7841
  USPC ...... 53/576, 577, 583, 138.7, 284.7; 248/99, 248/101; 220/908.1
  See application file for complete search history.

(56) References Cited

U.S. PATENT DOCUMENTS

| | | | | | |
|---|---|---|---|---|---|
| 3,817,448 | A | * | 6/1974 | Schneider | B65F 1/1415 232/43.2 |
| 4,550,553 | A | * | 11/1985 | Gaither | B65B 9/15 53/552 |
| 4,593,516 | A | * | 6/1986 | Alameda | B65B 51/00 53/138.3 |
| 5,918,447 | A | * | 7/1999 | Hanten | A22C 11/105 53/551 |
| 6,370,847 | B1 | * | 4/2002 | Jensen | B65B 9/15 53/370 |
| 6,502,367 | B1 | * | 1/2003 | Sterner | B65B 51/00 53/138.3 |
| 6,846,235 | B2 | * | 1/2005 | Topfer | A22C 11/125 452/32 |
| 7,494,022 | B2 | * | 2/2009 | Buchalter | B65F 1/06 220/495.11 |
| 10,526,733 | B2 | * | 1/2020 | Rapp | D04C 3/48 |
| 2006/0010837 | A1 | * | 1/2006 | Jurus | B65F 1/062 53/436 |

FOREIGN PATENT DOCUMENTS

| | | | | |
|---|---|---|---|---|
| GB | 2520568 A | * | 5/2015 | |
| GB | 2520568 A | * | 5/2015 | ........... B65B 51/146 |
| KR | 20180098061 A | * | 9/2018 | |

* cited by examiner

BAGGING MECHANISM FOR TRASH BAGS AND SMART TRASH RECEPTACLE

TECHNICAL FIELD

The present invention relates to the field of smart trash receptacles and, in particular, to a bagging mechanism for trash bags and a smart trash receptacle.

BACKGROUND

With the development of science and technology, trash receptacles are becoming more and more intelligent. Most existing smart trash receptacles available in the marketplace do not have a mechanism for sealing and bagging. Instead, they are only capable of cover opening/closing based on automatic sensing and thus simple in functionality, or designed to use a drawstring trash bag with a string around its open end. In order to bag trash, the string can be drawn out so that the open end of the bag is gradually narrowed with the portion of the string remaining around the open end increasingly reduced. Although this approach is simple, the drawstring trash bag as a consumable costs much and is not favorable to resource conservation and utilization, and the approach itself relies totally on manual bagging and is absent of automation. There are also some trash receptacles allowing semi-automatic bagging by using sealing tapes with a tape bagging assembly equipped outside or on the top of the receptacle. During the bagging process, the trash bag is manually taken out from the receptacle and narrowed around the open end. The narrowed portion is then placed through an opening of the tape bagging assembly, with the portions on both sides thereof being held by the hands in order to enable sealing and closure of the trash bag. This bagging solution still involves much manual intervention, making it only semi-automatic rather than fully-automatic. Moreover, the sealing tends to be inadequate and suffer from water seepage.

Therefore, how to address the issue that the conventional smart trash receptacles do not have an automatic bagging mechanism or are only capable of semi-automatic trash bagging, with insufficient bag sealing, insecure sealing and low loading capacity remains a critical technical problem sought to be solved by those skilled in the art.

SUMMARY

It is an object of the present invention to provide a bagging mechanism for trash bags and a smart trash receptacle, which solve the issue that the conventional smart trash receptacles do not have an automatic bagging mechanism or are only capable of semi-automatic trash bagging, with insufficient bag sealing, insecure sealing and low loading capacity.

The present invention provides a bagging mechanism for trash bags disposed within a body of a trash receptacle. A first fixed edge and a second fixed edge intersecting the first fixed edge are provided at tops of internal surfaces of the body of the trash receptacle. The bagging mechanism comprises a first pressing bar, which is able to slide along the first fixed edge to gather the open end of the trash bag onto the second fixed edge, and a second pressing bar, which is able to slide along the second fixed edge to gather the open end of the trash bag onto the first fixed edge. The first pressing bar and the second pressing bar are further able to work together to gather the trash bag to the intersection of the first fixed edge and the second fixed edge, in the vicinity of which, a heat fusing device is disposed for sealing the trash bag. The bagging mechanism further comprises driving means for driving the first pressing bar and the second pressing bar to move.

Preferably, the intersection of the first fixed edge and the second fixed edge may be implemented as an arcuate chamfer.

Preferably, a first fixed bar and a second fixed bar intersecting the first fixed bar may be fixedly arranged at the tops of internal surfaces of the body of the trash receptacle, with a lateral edge of the first fixed bar forming the first fixed edge, and a lateral edge of the second fixed bar forming the second fixed edge.

Preferably, the body of the trash receptacle may comprise a receptacle section and a main cover section residing on the receptacle section, wherein the first pressing bar, the second pressing bar, the first fixed bar, the second fixed bar, the driving means and the heat fusing device are all disposed within the main cover section.

Preferably, the second pressing bar may be disposed parallel to the first fixed bar and the first pressing bar to the second fixed bar, wherein guide means are provided respectively between the first pressing bar and the first fixed bar, between the first pressing bar and the second pressing bar, between the second pressing bar and the second fixed bar and between the second pressing bar and the first pressing bar, and wherein under the guidance of those guide means, the first pressing bar and the second pressing bar are able to gather the open end of the trash bag to the intersection of the first fixed edge and the second fixed edge.

Preferably, the first pressing bar may define a guide slot, which extends axially with respect thereto, and through which one end of the second pressing bar is inserted, wherein the first pressing bar further defines, at one end, a first guide hole for the passage of the first fixed bar therethrough; the first pressing bar is able to reciprocate axially with respect to the first fixed bar and the second pressing bar; the second pressing bar further defines, at one end, a second guide hole for the passage of the second fixed bar therethrough; and the second pressing bar is able to reciprocate axially with respect to the second fixed bar and the first pressing bar.

Preferably, a baseplate may be further provided, which is an elastic flexible material arranged on a lateral side of the second pressing bar corresponding to the heat fusing device.

Preferably, the driving means may comprise a motor, a gear assembly and a synchronous belt assembly, the motor being drivingly connected to the gear assembly, the gear assembly being engagingly connected to the synchronous belt assembly, wherein the first pressing bar and the second pressing bar are fastened to the synchronous belt assembly.

Preferably, the driving means may be a linear motor drivingly connected to the first pressing bar and the second pressing bar.

Preferably, the driving means may comprise a motor, a gear assembly and a level screw assembly, the motor being drivingly connected to the gear assembly, the gear assembly being engagingly connected to the level screw assembly, wherein the first pressing bar and the second pressing bar are connected to the level screw assembly by revolute pairs.

Preferably, the heat fusing device may comprise a heating wire for heat fusing a portion of the trash bag to be sealed, a sensor for sensing a temperature of the heating wire and a control mechanism communicatively coupled to the sensor, the control mechanism being connected to the heating wire by a cable harness and configured to control the temperature of the heating wire based on a value sensed by the sensor.

Preferably, the present invention also provides a smart trash receptacle comprising the bagging mechanism for trash bags as defined in any one of the above paragraphs.

With the bagging mechanism for trash bags for a smart trash receptacle provided in the present invention, the open end of the trash bag is first gathered to the second fixed edge by the first pressing bar and then gathered to the first fixed edge by the second pressing bar. As a result, the open end of the trash bag is fixed at the intersection of the first fixed edge and the second fixed edge, where the portion of the trash bag to be sealed is subsequently sealed by the heat fusing device disposed in the vicinity. As such, the issue that the conventional smart trash receptacles do not have an automatic bagging mechanism or are only capable of semi-automatic trash bagging, with insufficient bag sealing, insecure sealing and low loading capacity can be addressed.

It is to be understood that both the foregoing general description and the following detailed description are exemplary and explanatory only and are not restrictive of the present application.

BRIEF DESCRIPTION OF THE DRAWINGS

In FIGS. 1 to 6, 1 denotes a body of a trash receptacle; 2, a first pressing bar; 3, a second pressing bar; 4, a heat fusing device; 5, a first fixed bar; 6, a second fixed bar; 7, a guide slot; 8, a main cover section; 9, driving means; 10, a baseplate; 11, a synchronous belt assembly; 12, an arcuate chamfer; 41, a base; 42, an adhesive tape; 43, a ceramic plate; 44, a heating wire; 45, a cable clip; 46, a cable harness; and 47, a stop block.

DETAILED DESCRIPTION

Particular embodiments disclosed herein provide a smart trash receptacle and a bagging mechanism for trash bags, which solves the issue that the conventional smart trash receptacles do not have an automatic bagging mechanism or are only capable of semi-automatic trash bagging, with insufficient bag sealing, insecure sealing and low loading capacity.

The embodiments will be described below with reference to the accompanying drawings. In addition, the embodiments set forth below do not limit the invention as defined by the appended claims in any sense. Further, none of the features described in the following embodiments are considered necessarily essential to the subject matter of the claims attached.

Figure 1:
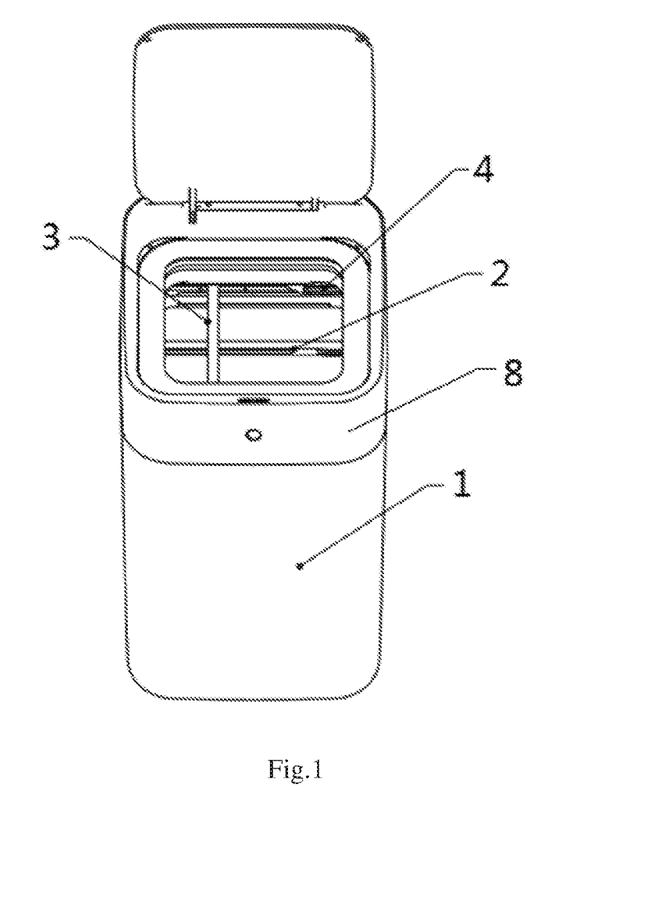
FIG. 1 is a structural schematic illustrating the position of a bagging mechanism for trash bags in a body of a trash receptacle body according to an embodiment of the present invention.
Figure 2:
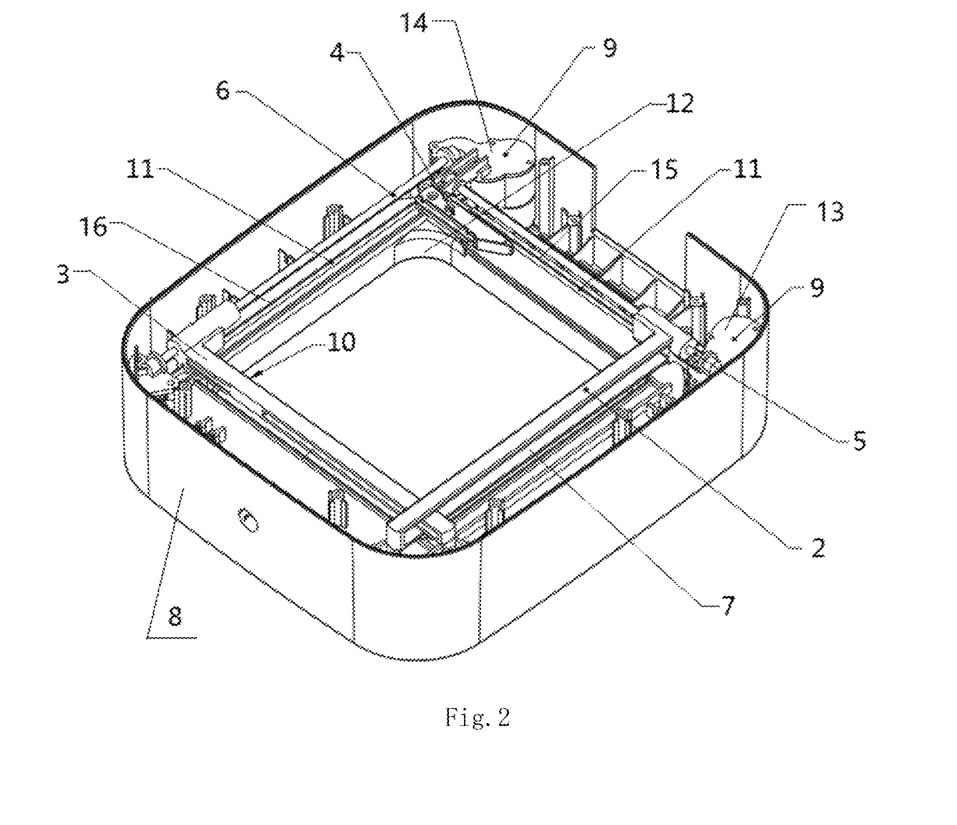
FIG. 2 is a structural schematic of a bagging mechanism for trash bags according to an embodiment of the present invention.

Reference is made to FIGS. 1 to 2, a bagging mechanism for trash bags for a smart trash receptacle provided in an embodiment that is used to automatically gather and seal an open end of a trash bag full with trash and is disposed within a body of the trash receptacle 1. A first fixed edge and a second fixed edge are provided at tops of internal surfaces of the body of the trash receptacle 1. The first fixed edge intersects the second fixed edge. Further, it may be configured that the first and second fixed edges are perpendicular to each other.

The bagging mechanism includes: a first pressing bar 2, which is able to slide along the first fixed edge to gather the open end of the trash bag onto the second fixed edge; and a second pressing bar 3, which is able to slide along the second fixed edge to gather the open end of the trash bag onto the first fixed edge. In addition, the first pressing bar 2 and the second pressing bar 3 are further able to work together to gather the trash bag to the intersection of the first fixed edge and the second fixed edge. In the vicinity of the intersection, a heat fusing device 4 is disposed for sealing the open end of the trash bag. As a result, the open end of the trash bag can be gathered up at one point, making it easier to be sealed. Moreover, during the heat fusing and sealing by the heat fusing device 4, it is less possible for thermal damage to the bag body and leakage of trash.

Further, it also includes driving means 9 for driving the first pressing bar 2 and the second pressing bar 3 to automatically gather the open end of the trash bag without human intervention, promoting convenience in our lives.

With the above arrangement, the issue that the conventional smart trash receptacles do not have an automatic bagging mechanism or are only capable of semi-automatic trash bagging, with insufficient bag sealing, insecure sealing and low loading capacity can be solved.

In a preferred implementation of this embodiment, in order to gather the open end of the trash bag in a more concentrated and faster manner, the intersection of the first fixed edge and the second fixed edge may be implemented as an arcuate chamfer 12. In addition, a baseplate 10 may be provided, which may be implemented as an elastic flexible material arranged on a lateral side of the second pressing bar 3 corresponding to the heat fusing device 4. As such, the first pressing bar 2 and the second pressing bar 3 can gather the open end of the trash bag between the baseplate 10 and the heat fusing device 4, thus providing a buffer for the gathering of the trash bag and ensuring denser gathering.

Specifically, the baseplate 10 may be composed of the elastic flexible material and a TEFLON® tape bonded to the surface thereof. Using this tape allows convenient and fast attachment to the lateral side of the second pressing bar 3.

In this embodiment, the body of the trash receptacle 1 may include a receptacle section, and a main cover section 8 residing on the receptacle section. The first pressing bar 2, the second pressing bar 3, a first fixed bar 5, a second fixed bar 6, the driving means 9 and the heat fusing device 4 may be all housed within the main cover section 8. Preferably, the first fixed bar 5, the second fixed bar 6, the first pressing bar 2 and the second pressing bar 3 may be disposed on respective four side walls of the main cover section 8 of the trash receptacle.

It should be noted that the first fixed bar 5 and the second fixed bar 6 perpendicular to the first fixed bar 5 may be fixedly disposed in the main cover section 8, with a lateral edge of the first fixed bar 5 forming the first fixed edge and a lateral edge of the second fixed bar 6 forming the second fixed edge. The second pressing bar 3 may be disposed parallel to the first fixed bar 5, and the first pressing bar 2 to the second fixed bar 6. Guide means may be provided respectively between the first pressing bar 2 and the first fixed bar 5, between the first pressing bar 2 and the second pressing bar 3, between the second pressing bar 3 and the second fixed bar 6 and between the second pressing bar 3 and the first pressing bar 2. Under the guidance of such guide means, the first pressing bar 2 and the second pressing bar 3 can gather the open end of the trash bag to the intersection of the first fixed edge and the second fixed edge.

The first pressing bar 2 may first transversely gather the open end of the trash bag under the guidance of the guide means, and the second pressing bar 3 may then longitudinally gather it under the guidance of the guide means. In this way, the issue that the conventional smart trash receptacles do not have an automatic bagging mechanism or are only capable of semi-automatic trash bagging, with insufficient bag sealing, insecure sealing and low loading capacity can be solved.

In one implementation, the first pressing bar 2 may define a guide slot 7, which extends axially with respect thereto, and through which one end of the second pressing bar 3 is inserted. The first pressing bar 2 may further define, at one end, a first guide hole for the passage of the first fixed bar 5 therethrough. The first pressing bar 2 is able to reciprocate axially with respect to the first fixed bar 5 and the second pressing bar 3. The second pressing bar 3 may further define, at one end, a second guide hole for the passage of the second fixed bar 6 therethrough, and the second pressing bar 3 is able to reciprocate axially with respect to the second fixed bar 6 and the first pressing bar 2.

It should be noted that, in order to facilitate the processing, a guide sleeve with a central hole may be fixedly provided at one end of the first pressing bar 2, and the central hole of the guide sleeve forms the first guide hole. Similarly, a guide sleeve with a central hole may also be fixedly provided at one end of the second pressing bar 3, and the central hole of the guide sleeve forms the second guide hole.

Preferably, in order to prevent the second pressing bar 3 from sliding out of the guide slot 7, the guide slot 7 may be closed at the ends.

In one implementation, the driving means may include a motor, a gear assembly and a synchronous belt assembly 11. The motor may be drivingly connected to the gear assembly so as to be able to drive the latter to rotate. The gear assembly may be engagingly connected to the synchronous belt assembly 11, and the first pressing bar 2 and the second pressing bar 3 may be both fastened to the synchronous belt assembly 11. As such, the synchronous belt assembly 11 can drive the first pressing bar 2 and the second pressing bar 3 to move. The synchronous belt assembly 11 may include a first synchronous belt 15 for driving the first pressing bar 2 to move and a second synchronous belt 16 for driving the second pressing bar 3 to move. For sake of convenience and spacing saving, the motor may be combined with gearbox assemblies to form motor/gearbox assemblies, including a first motor/gearbox assembly 13 for driving the first pressing bar 2 and a second motor/gearbox assembly 14 for driving the second pressing bar 3. At first, the first motor/gearbox assembly 13 may drive the first synchronous belt 15 to move the first pressing bar 2, with the first pressing bar 2 being fixed to the first synchronous belt 15 and the first fixed bar 5 being inserted through the first guide hole. The first guide hole may play a role in guidance, and the first fixed bar 5 may be fixed within the main cover section 8 of the trash receptacle. The first pressing bar 2 may translate axially with respect to the first fixed bar 5 to transversely gather the trash bag. After that, the second motor/gearbox assembly 14 may drive the second synchronous belt 16 to move the second pressing bar 3, with the second pressing bar 3 being fixed to the second synchronous belt 16 and the second fixed bar 6 being inserted through the guide slot 7. The guide slot 7 may play a role in guidance, and the second fixed bar 6 may also be fixed within the main cover section 8 of the trash receptacle and disposed perpendicular to the first fixed bar 5. The second pressing bar 3 may translate axially with respect to the second fixed bar 6 to longitudinally gather the open end of the trash bag. Meanwhile, in order to prevent the trash bag from being strongly pulled, buffer actions may be added to the gathering by the first pressing bar 2 and the second pressing bar 3. After the series of actions are performed, an automatic bagging process is completed.

In a second implementation, the driving means 9 may be a linear motor for directly driving the first pressing bar 2 and the second pressing bar 3 to move.

In a third implementation, the driving means 9 may include a motor, a gear assembly and a level screw assembly, wherein the first pressing bar 2 and the second pressing bar 3 may be connected to the level screw assembly by revolute pairs.

Of course, other driving means capable of driving the first pressing bar 2 and the second pressing bar 3 to move are also possible, depending on actual circumstances.

It should be noted that there may either be provided two independent driving means 9 or only one driving means 9. The first pressing bar 2 and the second pressing bar 3 are both connected to the driving means 9 and successively and independently moved under the action of the driving means 9. However, the movement is not limited to successive movement and may also be simultaneous movement.

Figure 3:
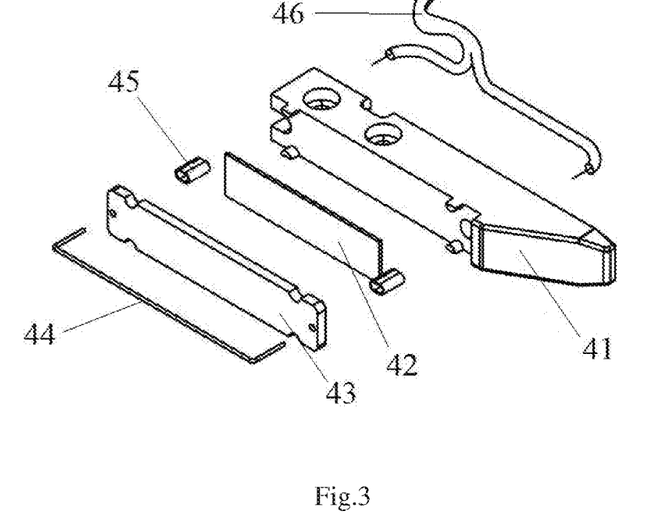
FIG. 3 is a schematic exploded view of a heat fusing device according to an embodiment of the present invention.

Referring to FIGS. 3 to 6, in this embodiment, the heat fusing device 4 may include a base 41, a ceramic plate 43 and a heating wire 44. As shown in FIG. 3, the base 41 may be fixed to the body of the trash receptacle 1 and provide accommodation for the ceramic plate 43. The heating wire 44 may be configured for fusion-cutting and thermally sealing an open end of the trash bag and connected to a heat-fusing circuit. Under the action of the heat-fusing circuit, the temperature of the heating wire 44 can be raised to a melting point of the trash bag so that the latter can be fusion-cut and sealed. Moreover, the ceramic plate 43 may be disposed and fixed between the base 41 and the heating wire 44 and may have a flat surface on which the heating wire 44 is supported, so that the heating wire 44 is disposed on the side of the ceramic plate 43 where the flat surface is present. Since the ceramic plate 43 has the properties of high temperature resistance, corrosion resistance, a long service life and good surface smoothness, when the heating wire 44 comes into contact with the trash bag for its heat fusion, the trash bag will rarely adhere to the heat fusing device 4, thus ensuring its good performance.

It should be noted that the flat surface of the ceramic plate 43 may be a smooth ceramic surface which is dense in texture and not permeable so that dust or dirt cannot easily adhere thereto. Additionally, the ceramic surface can be conveniently cleaned with a solvent, without suffering from any effect on the material properties. Moreover, as the ceramic plate 43 has good electrical and thermal insulation properties, it can prevent the base 41 from experiencing deformation or damage at a high temperature of the heating wire 44 and helps in avoiding current leakage in the device.

In doing so, during an automatic bagging process performed by the smart trash receptacle, the heat fusing device 4 is not only capable of ensuring good contact between the heating wire 44 and the trash bag, but can also prevent adhesion of the trash bag, thus addressing the issues of easy damage to the trash bag and accumulation of dirt in the heat fusing device 4, improving automatic bagging quality and enhancing the stability and reliability of the smart trash receptacle.

In this embodiment, the heating wire 44 may have bent portions at both ends, and the ceramic plate 43 may define through-holes in the flat surface. The through-holes may correspond to the respective bent portions so that the bent portions can be inserted through the through-holes to be fixedly connected to the base 41. In other words, the heating wire 44 has a heat fusing portion and bent portions. The bent portions are connected to the heat-fusing circuit, while the heat fusing portion is configured to be brought into contact with the trash bag to fusion-cut and seal it. As such, since the bent portions of the heating wire 44 are inserted through the through-holes and fixed to the base 41, the connection of the heating wire 44 is firm. Moreover, as the heat fusing portion of the heating wire 44 entirely rests on the flat surface of the ceramic plate 43, adhesion of the trash bag can be effectively prevented.

Further, the bent portions of the heating wire 44 may be fixed to the base 41 by means of cable clips 45. Each of the cable clips 45 may have an opening allowing the passage of a wire therethrough and an adjusting member for adjusting the size of the opening. During use, the bent portions are inserted into the openings, and the adjusting members are then manipulated to narrow the openings, so that the bent portions are fastened to the base 41 together with the cable clips 45. As the cable clips 45 are simple in structure, easy to use and inexpensive, they can help in saving labor for assembly and manufacturing cost.

Figure 4:
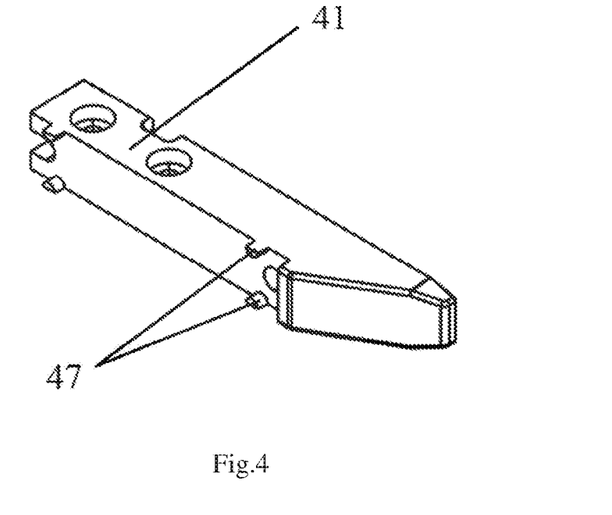
FIG. 4 shows a front axial side of a base of a heat fusing device according to an embodiment of the present invention.
Figure 5:
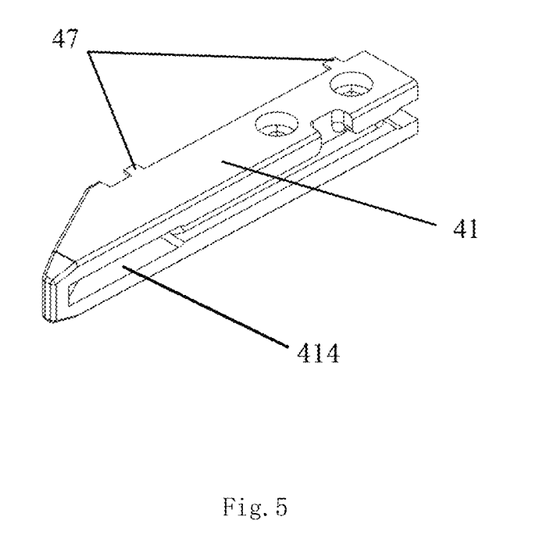
FIG. 5 shows a rear axial side of a base of a heat fusing device according to an embodiment of the present invention.

The base 41 may define notches in which the cable clips 45 can be snugly received. Moreover, when the cable clips are received in the notches, the cable clips 45 may experience inner-diametrical reductions, thereby locking the bent portions therein. As such, the cable clips 45 and the notches constitute space-saving fasteners for the heating wire 44 with improved smoothness and few burrs that may scratch the trash bag.

In some implementations, the base 41 may have a first end surface in contact with the ceramic plate 43 and a second end surface opposing the first end surface. An adhesive tape 42 may be provided between the first end surface and the ceramic plate 43 to bond them together. As such, the attachment of the ceramic plate 43 to the base 41 can be accomplished with a simple structure by easy operations. This can save time and labor and helps in improving operational efficiency.

In order for more stable connection between the ceramic plate 43 and the base 41 to be achieved, at least one set of stop blocks 47 may be provided on the first end surface of the base 41, and accordingly, at least one set of notches may be formed in edges of the ceramic plate 43. Each set of stop blocks 47 may be in one-to-one correspondence with a respective set of notches so that the distances between the stop blocks 47 go with the distances between the notches. Each of the notches may penetrate through the ceramic plate 43 in a thickness-wise direction thereof. Here, the "thickness-wise direction" refers to a direction pointing from one flat surface of the ceramic plate 43 to the other flat surface thereof. In this way, in order to fasten the ceramic plate 43 to the base 41, each set of stop blocks 47 may be snapped in a corresponding set of notches, making the attachment of the ceramic plate 43 to the first end surface of the base 41 more snug and firm. Preferably, two sets of stop blocks 47 and two sets of notches, i.e., four snap-on fasteners, may be provided to further increase the stability in the attachment of the ceramic plate 43.

Figure 6:
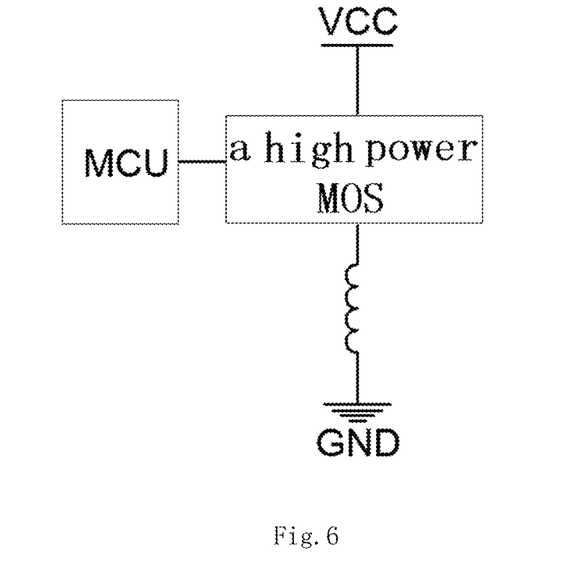
FIG. 6 is a structural schematic illustrating how a heat fusing device is controlled according to an embodiment of the present invention.

Further, the heat fusing device 4 includes the control mechanism and the sensor. The sensor is configured to sense the temperature of the heating wire 44 and communicatively coupled to the control mechanism. Preferably, the sensor is a temperature sensor. The control mechanism incorporates the heat-fusing circuit and is coupled to the heating wire 44 via the cable harness 46. During a heat fusion process, the control mechanism may control the temperature of the heating wire 44 based on a value of the temperature of the heating wire 44 sensed by the sensor so as to ensure that the trash bag can be always heat fused at the temperature of the heating wire 44. This is favorable to automatic temperature adjustment for the heating wire 44, ensures good automatic bagging quality and improves the utility and reliability of the smart trash receptacle.

The base 41 may have the first end surface and the second end surface opposing the first end surface. That is, the first end surface and the second end surface are on opposing sides. The second end surface of the base 41 may define a cable groove in which the cable harness 46 is received. Hiding the cable harness 46 in the cable groove 414 can provide protection to the circuit, facilitate the assembly of the heat fusing device 4 and enable component modularization.

In some preferred implementations, the control mechanism includes a microcontroller unit (MCU) which, as shown in FIG. 6, is communicatively coupled to both the temperature sensor and a high power MOS device and adapted to adjust an output power level of the high power MOS device based on the sensed value of the temperature sensor, thus enabling the control over the heating wire 44. The MOS device is also known as a MOS transistor or a metal-oxide-semiconductor field-effect transistor (MOSFET).

In this embodiment, there is also provided a smart trash receptacle incorporating the bagging mechanism for trash bags as defined above. In doing so, the problems of proneness to thermal damage at the sealed portion due to a small material thickness there arising from the unidirectional gathering method adopted in automatic bagging mechanisms of conventional smart trash receptacles can be solved. Since the smart trash receptacle offers the substantially same beneficial effects as the above-described bagging mechanism, it will not be described in further detail herein for the sake of simplicity.

It should be noted that the terms "first", "second", etc. as used herein are intended merely to distinguish between elements or functionalities rather than implying any particular sequence or order.

The foregoing description merely presents a few particular embodiments of the present invention and does not limit the scope thereof in any sense. Any and all variations or substitutions easily devisable by those familiar with the art in light of the teachings disclosed herein are considered to fall within the scope of the present invention. Accordingly, the scope of the invention shall be as defined in the appended claims.

What is claimed is:

1. A bagging mechanism for a trash receptacle (1), the trash receptacle having
   a body, and
   a first fixed edge and a second fixed edge intersecting the first fixed edge provided at top portions of internal surfaces of the body, the bagging mechanism comprising:
a first pressing bar (2), which is configured to slide along the first fixed edge to gather an open end of a trash bag onto the second fixed edge;
a second pressing bar (3), which is configured to slide along the second fixed edge to gather the open end of the trash bag onto the first fixed edge, wherein the first pressing bar (2) and the second pressing bar (3) are further configured to work together to gather the trash bag to the intersection of the first fixed edge and the second fixed edge;
a heat fusing device (4) disposed for heat fusing and sealing the trash bag gathered by the first pressing bar (2) and second pressing bar (3) and positioned at the intersection; and
a driving device for driving the first pressing bar (2) and the second pressing bar (3) to move.

2. The bagging mechanism of claim 1, wherein a first fixed bar (5) and a second fixed bar (6) intersecting the first fixed bar (5) are fixedly arranged at the top portions of internal surfaces of the body of the trash receptacle (1), with a lateral edge of the first fixed bar (5) forming the first fixed edge, and a lateral edge of the second fixed bar (6) forming the second fixed edge.

3. The bagging mechanism of claim 2, wherein
the body of the trash receptacle (1) comprises a receptacle section and a main cover section (8) residing on the receptacle section; and
the first pressing bar (2), the second pressing bar (3), the first fixed bar (5), the second fixed bar (6), the driving device (9) and the heat fusing device (4) are all disposed within the main cover section (8).

4. The bagging mechanism of claim 3, wherein
the second pressing bar (3) is disposed parallel to the first fixed bar (5) and the first pressing bar (2) is disposed parallel to the second fixed bar (6),
guide devices are provided respectively between the first pressing bar (2) and the first fixed bar (5), between the first pressing bar (2) and the second pressing bar (3), between the second pressing bar (3) and the second fixed bar (6) and between the second pressing bar (3) and the first pressing bar (2), and
under guidance of the guide devices, the first pressing bar (2) and the second pressing bar (3) are configured to gather the open end of the trash bag to the intersection of the first fixed edge and the second fixed edge.

5. The bagging mechanism of claim 4, wherein
the first pressing bar (2) defines a guide slot (7), which extends axially with respect thereto, and through which one end of the second pressing bar (3) is inserted;
the first pressing bar (2) further defines, at one end, a first guide hole for passage of the first fixed bar (5) therethrough;

the first pressing bar (2) is configured to reciprocate axially with respect to the first fixed bar (5) and the second pressing bar (3);
the second pressing bar (3) further defines, at one end, a second guide hole for passage of the second fixed bar (6) therethrough; and
the second pressing bar (3) is configured to reciprocate axially with respect to the second fixed bar (6) and the first pressing bar (2).

6. The bagging mechanism of claim 1, wherein a baseplate (10) is further provided, which is an elastic flexible material arranged on a lateral side of the second pressing bar (3) facing the heat fusing device (4).

7. The bagging mechanism of claim 1,
wherein the driving device (9) comprise
a motor,
a gear assembly, and
a synchronous belt assembly (11),
the motor being drivingly connected to the gear assembly, the gear assembly being engagingly connected to the synchronous belt assembly (11), and
wherein the first pressing bar (2) and the second pressing bar (3) are fastened to the synchronous belt assembly (11).

8. The bagging mechanism of claim 1, wherein the heat fusing device (4) comprises:
a heating wire (44) for heat fusing a portion of the trash bag to be sealed,
a sensor for sensing a temperature of the heating wire (44), and
a control mechanism communicatively coupled to the sensor, the control mechanism being connected to the heating wire (44) by a cable harness (46) and configured to control the temperature of the heating wire (44) based on a value sensed by the sensor.

9. A trash receptacle, comprising the bagging mechanism as defined in claim 1.

10. A trash receptacle, comprising the bagging mechanism as defined in claim 2.

11. A trash receptacle, comprising the bagging mechanism as defined in claim 3.

12. A trash receptacle, comprising the bagging mechanism as defined in claim 4.

13. A trash receptacle, comprising the bagging mechanism as defined in claim 5.

14. A trash receptacle, comprising the bagging mechanism as defined in claim 6.

15. A trash receptacle, comprising the bagging mechanism as defined in claim 7.

16. A trash receptacle, comprising the bagging mechanism as defined in claim 8.

* * * * *